United States Patent [19]

Dolansky et al.

[11] Patent Number: 4,916,990
[45] Date of Patent: Apr. 17, 1990

[54] METHOD FOR CONTROLLING THE PATH OF A PUNCHING TOOL

[75] Inventors: Stefan Dolansky, Nuremberg; Guenter Broemer, Spardorf; Volker Reetz, Bad Karlshafen, all of Fed. Rep. of Germany

[73] Assignee: Siemens Aktiengesellschaft, Fed. Rep. of Germany

[21] Appl. No.: 280,567

[22] Filed: Dec. 6, 1988

[30] Foreign Application Priority Data

Dec. 23, 1987 [DE] Fed. Rep. of Germany ....... 3743869

[51] Int. Cl.[4] ...................... B23Q 15/14; B23Q 15/24
[52] U.S. Cl. .......................................... 83/34; 83/76.6; 83/916; 83/49; 364/474.2; 364/474.29; 51/165.71
[58] Field of Search ................. 83/34, 36, 71, 49, 556, 83/559, 565, 916; 409/80, 84, 131; 364/474.2, 474.29; 51/165.71

[56] References Cited

U.S. PATENT DOCUMENTS

| 3,541,243 | 11/1970 | Whitsel | 83/71 |
| 3,838,618 | 10/1974 | Eissfeldt et al. | 83/34 |
| 4,503,493 | 3/1985 | Burkhardt et al. | 364/474.29 |
| 4,535,408 | 8/1985 | Kishi et al. | 364/474.29 |
| 4,602,541 | 7/1986 | Benzinger et al. | |
| 4,696,211 | 9/1987 | Bitzel | |
| 4,700,314 | 10/1987 | Kinoshita | 364/474.29 |
| 4,739,489 | 4/1988 | Kishi et al. | 364/474.29 |

FOREIGN PATENT DOCUMENTS

| 0178640 | 4/1986 | European Pat. Off. . |
| 2512458 | 3/1975 | Fed. Rep. of Germany . |
| 421246 | 3/1967 | Switzerland . |

Primary Examiner—Frank T. Vost
Assistant Examiner—Scott A. Smith

[57] ABSTRACT

So that the path (BB, V1 to V7) for a rotable polygonal punching tool (WZ) can be determined easily, the workpiece contour (K), the dimension of the tool (x, y), the position of the axis of rotation (x/2, y/2) and the sense of direction of the machining are set by the operator into a numerical control (ST). An equidistant track (BB) is therefrom determined by the control (ST), such as is customary for milling operations. This track (BB), however, is corrected in the vicinity of corner of the workpiece contour (K) by the control (ST) in such a manner that punching optimized with respect to distance and time and with high contour fidelity is made possible.

2 Claims, 2 Drawing Sheets

METHOD FOR CONTROLLING THE PATH OF A PUNCHING TOOL

BACKGROUND OF THE INVENTION a. Field of Invention

The invention relates to a method for the numerical control of the path of a polygonal punching tool of a punch press wherein the tool can be rotated in the punching direction about an axis of rotation in such a manner that the cutting edge of the tool can be guided tangentially along the contour of a workpiece.

b. Description of the Prior Art

It is customary to employ so-called nibble machines to work sheet metal parts with a given contour from metal sheets. If the nibbling tool is round, a relatively large number of punching strokes per unit of distance must be made when linear sections of the contour are to be punched, in order to avoid roughness. Therefore, the speed with which a workpiece can be generated may be greatly limited. For this reason, polygonal punching tools are used in modern punching machines which punch out with every punching operation a large section of the desired contour as compared to a nibbling process with round tools. (All tools deviating very much from the circular form can be designated as polygonal.) The polygonal tool is made rotatable, so that contours can be processed in any desired direction as an inside as well as an outside contour. The setting of the paths for the punching tool in the numerical control of a punching machine is relatively costly since the path must first be divided into a multiplicity of subpaths which are set into the control individually.

OBJECTIVES AND SUMMARY OF THE INVENTION

It is an object of the invention to develop a method in such a manner that the path can be determined for a polygonal punching tool of a punch press in a simple manner.

According to the invention, this problem is solved by the provision that the contour of the work piece, the polygonal dimensions specific to the tool and the position of the axis of rotation of the tool are fed into the control. In response to a command specific to the direction of the machining for the punching operation, an equidistant motion track for the tool defined by the distance of the respective cutting edge from the axis of rotation of the tool to the contour of the workpiece. Points on the equidistant motion path are determined by the control at which the leading or lagging corner of the cutting edge as seen in the direction of the machining reaches a respective corner of the contour of the workpiece. The points of the equidistant motion path obtained before and after a corner determine the starting and end points of a translation track section associated with the respective corner of the contour. The resulting path of the tool is formed additively from the translation track sections as well as connecting the remaining sections of the equidistant motion path where the translation track sections are traversed with the tool lifted off the workpiece.

Due to the fact that each track section is designed as a linear track, the travel distance is minimized.

Due to the fact that the width of the machining zone required by the tool is monitored for maintenance of a predetermined maximum value, it can be assured that when a multiplicity of workpieces are to be punched out of a sheet, the punching operation for the individual workpieces does not intersect so that no rejected workpieces are produced.

BRIEF DESCRIPTION OF THE FIGURES

An embodiment of the invention is shown in the drawings and will be explained in greater detail in the following, wherein.

DETAILED DESCRIPTION OF THE INVENTION

Figure 1:
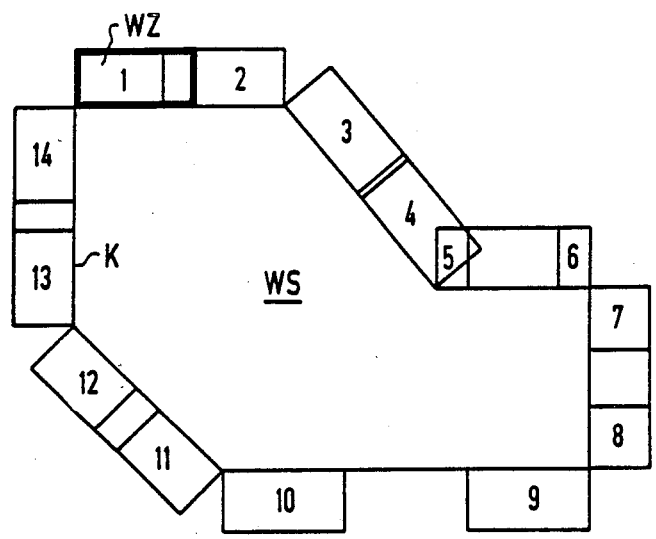
FIG. 1 shows several positions of the tool.

In FIG. 1, a workpiece WS is shown which has a contour K which is obtained by a number of edges merging into each other at corners. The positions of a tool WZ are shown by numerals 1–14 to generate contour K. Tool WZ is a rectangular punching tool. Position 1 is marked by bold lines. During the cutting of the contour, the tool WZ is continuously lifted and lowered. The maximum feed of the punching tool in the lifted condition is given by the length of the effective punching edge of the tool WZ.

According to a prior art method, starting from position 1, the tool WZ is moved first on a first linear motion track section to a position 2. Then, the tool WZ is rotated about the first edge of the workpiece WS to be produced. The tool reaches then position 3, and executes the next linear track section up to position 4. The tool is then rotated into position 5, and then moves linearly to position 6 along a further linear travel section. Similarly, the tool WZ is moved through the remaining intermediate motions to final position 14. The procedure described above must be fed or programmed into a control device for the corresponding punch press, not shown here, in such a manner that the space coordinates are given individually for all the positions 1 to 14. Such a procedure is very labor-intensive and is accordingly uneconomical especially if small number of work pieces are produced.

Figure 2:
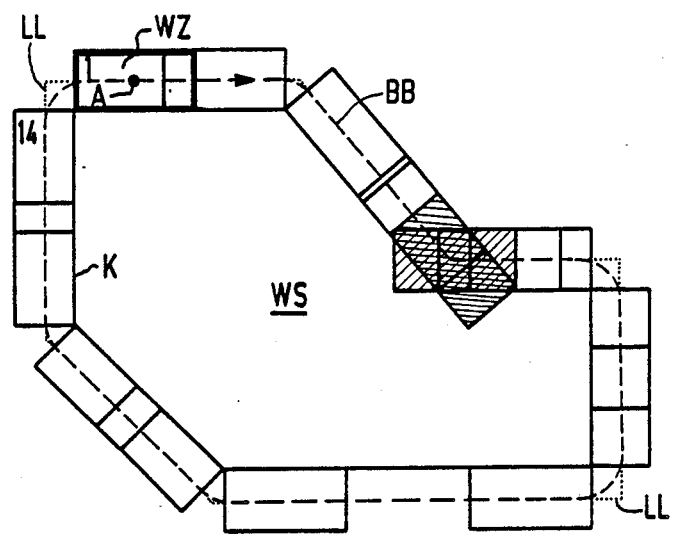
FIG. 2 shows an equidistant motion track.

In the control of milling tools it is customary to guide the tools along a track equidistant about the workpiece, wherein the respective distance of the axis of rotation of the milling tool from the effective edge of the workpiece is constant. Similarly, as shown in FIG. 2, the tool WZ can likewise be rotated about an axis A, about the workpiece WS. The instructions customary for the control from milling operations can then be repeated without change. In the presentation according to FIG. 2, such an equidistant motion track BB is indicated by a dashed line. The clockwise direction of motion is indicated by an arrow on this track. Otherwise the positions of the tool WZ correspond to positions 1 to 14 in FIG. 1. If the axis A of the tool WZ is moved along the equidistant motion path BB, every concave corner of the motion path leads to a situation wherein the tool WZ overlaps the desires contour K of the workpiece WS. Such an undesired position of the tool WZ is shown in FIG. 2 by a shaded area. For this reason a setting according to the equidistant motion track BB, for the tool WZ is not advisable.

In commercially available controls, an equidistant motion track is also understood to mean a track which has at the protruding edges of the contour, the shape defined by a dotted line LL.

Figure 3:
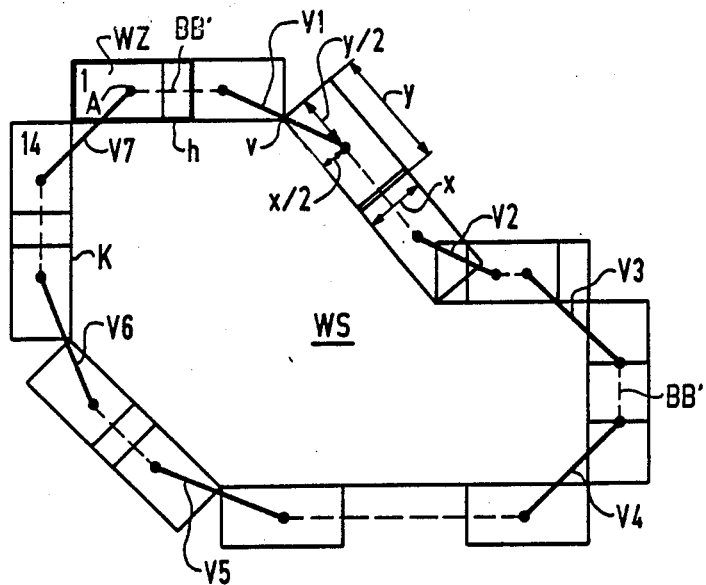
FIG. 3 shows the path resulting from the track of FIG. 2.

In the embodiment of FIG. 3, the same workpiece WS is shown which is to be formed by the tool WZ. This tool WZ accordingly occupies again sequential position 1 to 14. In this embodiment, the geometrical dimensions for the tool WZ are shown for a better understanding of the invention. Thus, it is shown in position 3 that the length of the cutting edge of tool WZ is equal to distance y, while the width of the tool corresponds to the distance x. The axis of rotation A of the polygonal tool WZ is located at the geometric center of the tool WZ at the coordinates x/2 and y/2.

The track, section on which the tool WZ is guided along the workpiece WS, is marked in FIG. 3 by dashed lines BB' joined by heavy linear (or translation) track sections V1 to V7. Track sections V1 –V7 are obtained by directly connecting lines between the positions of the axis A of the tool WZ at positions 1 to 14, as seen from FIG. 3, each of these positions being adjacent to a track section of the original contour K of WS which requires a change in direction of tool WZ. At each of these positions, the front corner v as seen in the machining direction or the rear corner h, respectively, of the cutting edge reaches a corner in the contour K. The resulting track sections V1 to V7 are connected to each other at their starting and end points by the equidistant motion track sections BB', similar to the corresponding sections of the track BB of FIG. 2. While sections BB' of the equidistant motion track are being traversed, the punching operation takes place. The track sections V1 and V7 are traversed with the tool WZ lifted off the workpiece WS.

By this method, it is ensured that no overlap of the contour of the workpiece WS occur as would happen for example between the positions 4 and 5 if the equidistant track section BB of FIG. 2 would be used. Furthermore, it is also ensured that all other edges, for which no danger exists that the contour K of the workpiece WS is overlapped, are reached by the shortest possible path.

Figure 4:
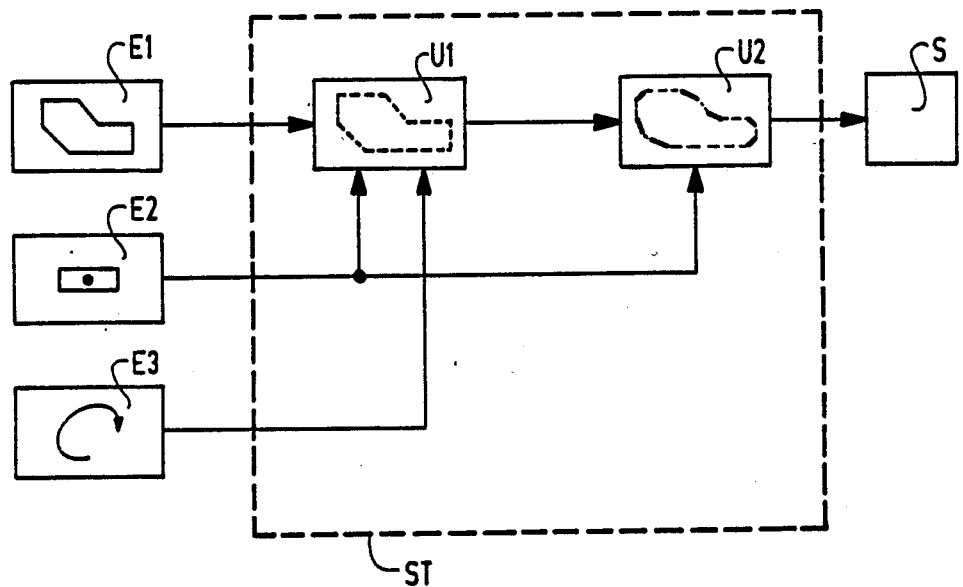
FIG. 4 shows a block diagram for an apparatus for obtaining the path of FIG. 3.

In FIG. 4, a block diagram is shown which serves once the apparatus for performing the method according to the invention. The contour K of the workpiece, for instance, the workpiece WS is fed through an input E1 into a translator U1 of a control ST of a punch press S, indicated by broken lines. The dimensions of a respective punching tool, for instance, of the tool WZ, are fed through an input E2 to the translator U1 and a translator U2 of the control ST. The sense of direction of the path in which the punching operation is to be executed is communicated to the translator U1 through a third input E3.

From the values of the inputs E1, E2 and E3, the translator U1 determines an equidistant motion track such as is customary for milling purposes (i.e. track BB as defined in FIG. 2). The equidistant motion track is passed on to the translator U2 and is replaced there in part by the linear motion track sections V1 to V7 as explained in reference to FIG. 3, the tool data being taken into consideration by the translator U2. The translator U2 then furnishes a resulting or final track for the polygonal punching tool which can be traversed by the punch press S.

In the embodiment described above, a rectangular tool is provided as the polygonal tool. However, it is also possible to use, for instance, trapezoidal tool. The axis of rotation of these tools can also lie outside the trapeze. Such trapezoidal tools are frequently used if sharp inside edges with angles smaller than 90 degrees are to be punched.

If punching tools are predominantly rectangular, this can lead to a situation that the tool needs a relatively wide machining space toward the contour it notches in a workplace. This may possibly lead to the situation where the desired contour of a further workpiece could be overlapped, which is to be punched out from the metal sheet. Therefore the controls also calculate the respective width of the machining zone and furnishes a warning signal which tells the operator that the use of a less wide tool is indicated for the punching operation, when a predetermined maximum value is exceeded.

It should further be pointed out that circular contour sections can be punched with a polygonal tool. The quality of the curve depends here on the punching feed when this section is being machined so that the feed rate is reduced in these regions from that used when machining linear sections.

What is claimed is:

1. A method for the numerical control of the path of a polygonal punching tool of a punch press, where the tool can be rotated about an axis of rotation in the punching direction in such a manner that the cutting edge of the tool can be guided tangentially along the contour of a workpiece, having a plurality of corners comprising the steps of:
    setting the contour (K) of the workpiece (WS), the polygon dimensions (x, y) specific to the tool (WZ) and the position of the axis of rotation (x/2, y/2) of the tool (WZ) into a control (ST);
    in response to a command defining a machining direction for bringing about the punching operation, generating an equidistant motion path (BB) for the tool (WZ) which is at a constant distance between the axis of rotation of the tool (WZ), and the contour (K) of the workplace (WS);
    determining the points (1–14) on the equidistant motion path (BB) by the control (ST), at which the front (v) or the rear corner (h) of the cutting edge, respectively, as seen in the machining direction, reaches each corner of the contour (K) of the workpiece (WS);
    defining path points of the equidistant motion path (BB) obtained before and after each corner to define the starting and end point of a linear translation track (V1 to V7) associated with each respective corner of the contour, wherein each path point defines the axis of rotation of the tool (K); and
    forming a resulting path of the tool (WZ) by adding the linear translation tracks (V1 to V7) to sections of the equidistant motion track (BB), the translation tracks (V1 to V7) being traversed with the tool (WZ) being lifted off the work piece (WS).

2. The method according to claim 1 wherein the width of a machining zone required by the tool (WZ) is monitored in relation to a predetermined maximum value.

* * * * *